United States Patent Office 3,519,616
Patented July 7, 1970

3,519,616
WATER-SOLUBLE MONOAZO DYESTUFFS
August Bauer, Frankfurt am Main, Gerhard Langbein,
Hofheim, Taunus, and Fritz Meininger, Frankfurt am
Main, Germany, assignors to Farbwerke Hoechst Aktiengesellschaft vormals Meister Lucius & Bruning,
Frankfurt am Main, Germany, a corporation of
Germany
No Drawing. Filed May 1, 1967, Ser. No. 634,833
Claims priority, application Germany, May 3, 1966,
F 49,094
Int. Cl. C09b 29/32
U.S. Cl. 260—193
6 Claims

ABSTRACT OF THE DISCLOSURE

Water-soluble monoazo dyestuffs which, in the form of the free acid, correspond to the general formula

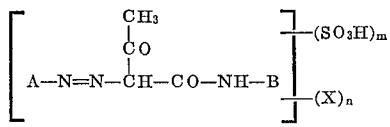

in which A represents a phenyl radical being substituted in ortho or para position to the azo group by an alkoxy, aralkoxy, or aryloxy group, or being substituted in para position to the azo group by an acylamino group, or a radical of the naphthalene series, B represents an aromatic or heterocyclic radical, $m$ represents an integer from 1 to 3, $n$ represents 1 or 2 and X represents one of the groupings of the formula $$-SO_2-CH_2-CH_2-Y$$

or $$-SO_2-CH=CH_2$$

bound to A and/or B, and in which Y represents a radical which can be split off by alkaline agents, and which are suitable for the dyeing or printing of textile materials of cellulose, wool, silk or polyamide fibers.

The present invention relates to new, valuable, water-soluble monazo dyestuffs and to a process for preparing them. More particularly, the present invention relates to monoazo dyestuffs which, in the form of the free acid, correspond to the general Formula 1

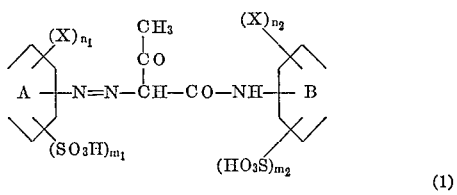

(1)

in which

A represents a phenyl radical being substituted in ortho or para position to the azo group by an alkoxy, aralkoxy or aryloxy group, or being substituted in para position to the azo group by an acylamino group, or a naphthalene radical,
B represents a radical of the benzene or naphthalene series or an aromatic-heterocyclic radical,
$m_1$ and $m_2$ represent integers from 0 to 2, the sum of $m_1$ and $m_2$ being 1 or 2,
$n_1$ and $n_2$ represent 0 or 1, the sum of $n_1$ and $n_2$ being 1 or 2,
X represents one of the groupings of the general Formula 2 or 3

$$-SO_2-CH_2-CH_2-Y \qquad (2)$$

or $$-SO_2-CH=CH_2 \qquad (3)$$

and in which

Y represents a radical which can be split off by alkaline agents.

The monoazo dyestuffs of the present invention, defined by the above Formula 1, can be obtained by coupling diazotized aromatic amines of the benzene series, which contain at least either one alkoxy, aralkoxy or aryloxy group standing in ortho and/or para position to the diazonium group or an acylamino group standing in para position to the diazonium group, or diazotized aromatic amines of the naphthalene series, with N-aceto-acetyl compounds of aromatic or heterocyclic amines, in selecting the components in such a manner that the monoazo dyestuffs obtained contain at least one sulfonic acid group and at least one group of the Formula 2 or 3.

As radicals Y, which can be split off by the action of agents having an alkaline action, there may be used, for example, a halogen atom such as a chlorine atom, an alkyl-sulfonic acid ester group or an aryl-sulfonic acid ester group, as well as an alkoxy group, such as an aryl-carboxylic acid ester group, or the acetoxy group, furthermore a phenoxy-amino or a dialkyl-amino group such, for example, as a dimethyl-amino or a dialkyl-amino group, furthermore the thiosulfuric acid ester group and, especially, the sulfuric acid ester group.

Instead of using diazo components or coupling components which contain a group of the aforementioned Formula 2, the radical Y or this group can be introduced, according to one method of carrying out the process of the present invention, subsequently into the prepared monoazo dyestuff. Thus for example, a grouping of the Formula 3 present in the monoazo dyestuffs obtained by the process of the present invention, may be reacted with salts of thiosulfuric acid, whereby a β-thiosulfato-ethyl group is formed. Moreover, the said group of the Formula 3 can be converted into a β-dialkylamino-ethyl group by the action of a dialkylamine.

On the other hand, dyestuffs which contain the group of the Formula 2 can be converted into dyestuffs containing the group of the Formula 3 by a treatment with agents having an alkaline reaction, for example, sodium hydroxide.

Another method of carrying out the process of the present invention consists in using, for the preparation of the dyestuffs of the Formula 1, diazo components or coupling components containing, instead of the aforesaid groupings 2 or 3, a group of the formula $$-SO_2-CH_2-CH_2-OH \qquad (4)$$

and in converting the β-hydroxy group in the azo dyestuffs into groups of the Formula 2 by known methods, for example, by treatment with inorganic or organic acids or derivatives thereof, such, for example, as sulfuric acid, amidosulfonic acid, acetylchloride or p-toluenesulfonic acid esters.

The diazo components or coupling components used for the preparation of the dyestuffs of the invention may contain, in addition to one of the above-mentioned groupings 2 or 3 or 4 and sulfonic acid groups, substituents which are usual in azo dyestuffs, for example halogen atoms, alkyl alkoxy, nitro, hydroxy, carboxylic acid, amino, acetylamino and benzoyl amino groups.

As diazo components, there may be used, for example, the following amino compounds:

1-amino-2-methoxybenzene-4-sulfonic acid,
1-amino-2-methoxybenzene-5-sulfonic acid,
1-amino-4-methoxybenzene-2-sulfonic acid, 1-amino-2,5-dimethoxybenzene-4-sulfonic acid,
1-amino-2-methoxy-4-nitrobenzene-6-sulfonic acid,
1-amino-4-acetylaminobenzene-6-sulfonic acid,
1-amino-2-methoxybenzene-5-β-hydroxyethylsulfone,
1-amino-2-methoxy-5-methylbenzene-4-β-hydroxyethylsulfone,
1-amino-2,5-dimethoxybenzene-4-β-hydroxyethylsulfone, or the sulfuric acid monoesters thereof, 1-amino-2-methoxybenzene - 5 - β - chloroethylsulfone, 1-amino-2-methoxy - benzene - 5 - vinylsulfone, furthermore 1- or 2-aminonaphthalene-monosulfonic acids, 2-aminonaphthalene-1,5-disulfonic acid, 2-aminonaphthalene-1,5,7-trisulfonic acid and 1- or 2-aminonaphthalene-β-hydroxyethylsulfone or the sulfuric acid monoesters thereof, or 4-amino-diphenyl-oxide-3-sulfonic acid.

As coupling components, there may be used, for example, the N-acetoacetyl compounds of the following amines: aminobenzene-monosulfonic acids and aminobenzene-disulfonic acids, which may contain other substituents, 1- or 2-aminonaphthalene-mono- or disulfonic acids, which may contain other substituents, and amino sulfonic acids of carbazole, diphenylene oxide and of other heterocycles.

Furthermore, there may be used, for example, the N-acetoacetyl compounds of 1-aminobenzene-3- or -4-β-hydroxyethylsulfone, 1 - amino-2-methoxy-5-methyl-benzene-4-β-hydroxyethylsulfone, 1 - (4' - aminobenzoyl)-amino-2-carboxy-benzene - 5 - β - hydroxyethylsulfone, 1-aminonaphthalene-4-β-hydroxyethylsulfone, 2 - aminonaphthalene-5-β-hydroxyethylsulfone, or their sulfuric acid monoesters, 1-aminobenzene-4-β-chloroethylsulfone and 1-amino-2-methoxybenzene-5-vinylsulfone.

The N-acetoacetyl compounds used as coupling components can be obtained according to methods known per se, for example by the reaction of corresponding amines with diketene in a weakly acetic aqueous medium. For preparing the dyestuffs of the present invention, it is not necessary to previously split off the aceto-acetyl compounds.

The esterification of dyestuffs which contain a group of the Formula 4 is suitably carried out by introducing the dyestuffs into concentrated sulfuric acid and by stirring the whole at room temperature until the dyestuffs have completely dissolved. The conversion of dyestuffs which contain a group of the Formula 4 into the corresponding sulfuric acid esters can also be effected by reaction of the hydroxy group of the hydroxyethylsulfone radical with an agent yielding sulfur trioxide, such for example, as chlorosulfonic acid or amidosulfonic acid, in an inert organic solvent. Suitable solvents are, for example, dimethyl formamide, dimethyl sulfoxide, quinoline, dimethylaniline, pyridine or homologs of pyridine, such as picoline.

The monoazo dyestuffs obtained according to the process of the present invention are suitable for the dyeing of cellulosic materials such as those of cotton, linen, viscose rayon or staple fibers. They can be applied by any one of the usual dyeing and printing methods for reactive dyestuffs and yield on cellulosic materials, in the presence of agents having an alkaline reaction, brilliant and partly very greenish yellow shades having a very good fastness to light and to wetting, with a high colour yield. They may also be used for the dyeing or printing of wool, silk or polyamide fibers, in which case they are applied from acid, neutral or weakly alkaline dye baths or printing pastes.

Compared with the next comparable azo dyestuffs described in German Pat. 965,902, the monoazo dyestuffs obtained according to the present invention are superior with regard to build up (ratio of dyestuffs concentration to colour intensity obtained) and colour intensity of their prints on cotton as well as with regard to clearness of shade and stability of the alkaline printing pastes.

The following examples illustrate the invention but they are not intended to limit it thereto.

EXAMPLE 1

122.5 parts by weight of 1-amino-2-methoxy-5-methyl-benzene-4-β-hydroxy-ethylsulfone were introduced into 600 parts by weight of concentrated sulfuric acid and stirred overnight at room temperature. Then, the sulfuric acid solution was poured onto 1,200 parts by weight of ice and the reaction mixture was neutralized by careful addition of sodium carbonate. Thereafter, 25 parts by weight of glacial acetic acid were added, the whole cooled to 0° C. at which temperature 50 parts by weight of diketene were added dropwise within at least 2 hours. Stirring was continued for 5–6 hours, and then the solution was introduced into a diazo suspension obtained in the usual manner by diazotizing 151.5 parts by weight of 2-naphthyl-amine-1,5-disulfonic acid. By adding sodium carbonate the coupling mixture was rendered weakly acidic to neutral and coupling was completed in this pH-range. The dyestuff was salted out by adding potassium chloride, filtered off and dried in a vacuum chamber at 50° to 60° C. A yellow powder, which dissolves in water to give a yellow solution, was obtained.

In the form of the free acid, the dyestuff had the following formula

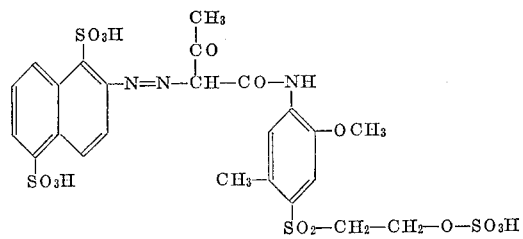

This dyestuff gave on fibers of natural and regenerated cellulose, in the presence of alkalies, brilliant, very greenish yellow dyeings and prints, that had a very good fastness to wetting, good fastness to chlorine, to chlorinated tap water and to light. The dyestuff dyed also wool, silk or polyamide fibers clear, greenish yellow shades.

EXAMPLE 2

122.5 parts by weight of 1-amino-2-methoxy-5-methyl-benzene-4-β-hydroxyethylsulfone were converted according to Example 1 into the sulfuric acid ester and then into the corresponding acetoacetyl compound by means of diketene. This solution was introduced into a diazo suspension, obtained in the usual manner by diazotization of 108.5 parts by weight of 1-amino-2-methoxy-5-methyl-benzene-4-sulfonic acid. By the addition of sodium carbonate the coupling mixture was adjusted to a pH-value ranging from weakly acid to neutral and coupling was completed at this pH-range. The dyestuff was salted out by adding potassium chloride, filtered off with suction and dried in a vacuum chamber at 50°–60° C. A yellow powder, which dissolved in water to give a yellow solution, was obtained.

In the form of the free acid, the dyestuff had the following formula:

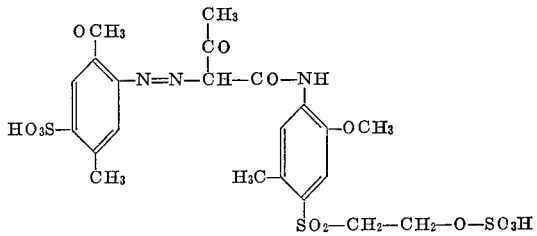

In the presence of alkalies, this dyestuff gave on fibers of natural and regenerated cellulose brilliant, very greenish yellow dyeings and prints having a very good fastness to wetting, good fastness to chlorinated tap water and to light.

EXAMPLE 3

108.5 parts by weight of 1-amino-2-methoxy-5-methylbenzene-4-sulfonic acid were stirred into 800 parts by weight of water and neutralized with sodium bicarbonate. 25 parts by weight of glacial acetic acid were added. Then 50 parts by weight of diketene were added dropwise within 2 hours at 0° to 10° C. and the whole was stirred for 5 to 6 hours. This solution was introduced into a diazo solution obtained in usual manner by diazotization of 122.5 parts by weight of 1-amino-2-methoxy-5-methylbenzene - 4 - β - hydroxyethylsulfone. Coupling was completed in the neutral to weakly acid range, adjusted by the addition of sodium carbonate.

The yellow dyestuff that had formed was precipitated by adding potassium chloride, filtered off and, after drying at 70° to 80° C., powdered finely. For conversion into the sulfuric acid ester the dyestuff powder thus obtained was introduced into 1,500 parts by weight of concentrated sulfuric acid and stirred overnight at room temperature. Thereupon, the reaction mixture was poured onto 3,000 parts by weight of ice powder. The dyestuff was salted out by adding potassium chloride, filtered off and washed until neutral with a potassium chloride solution of 20% by weight and dried in a vacuum chamber at 50° to 60° C. A yellow powder, which dissolved in water to give a yellow solution, was obtained.

In the form of the free acid, the dyestuff had the following formula:

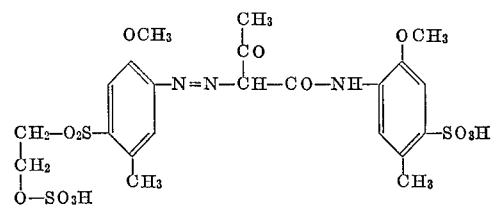

In the presence of alkalies, this dyestuff gave on fibers of natural and regenerated cellulose brilliant, greenish yellow dyeings and prints that had very good fastness to wetting and good fastness to light.

EXAMPLE 4

79 parts by weight of the dyestuff powder obtained according to Example 3, first paragraph, were introduced at 85° to 90° C. into 250 parts by weight of anhydrous pyridine. Then, 7.4 parts by weight of urea and 42 parts by weight of amidosulfonic acid were added and the whole was heated for half an hour to 100°–105° C. Thereafter, the mixture was poured into 2,000 parts by weight of water and the dyestuff was isolated by salting out with potassium chloride. The dyestuff that had precipitated was filtered off and the filter residue was washed with a potassium chloride solution having a concentration of 25% by weight.

The product obtained was identical with the dyestuff obtained by esterification with concentrated sulfuric acid according to Example 3.

EXAMPLE 5

130.5 parts by weight of 1-amino-2,5-dimethoxybenzene-4-β-hydroxyethylsulfone were converted, according to Example 1, into the sulfuric acid ester and subsequently into the corresponding acetoacetyl compound by means of diketene. This solution was introduced into a diazo suspension obtained in the usual manner by diazotization of 101.5 parts by weight of 1-amino-2-methoxybenzene-4-sulfonic acid. The further operation was carried out as described in Example 1, whereupon a yellow powder was obtained which dissolved in water to give a yellow solution.

In the form of the free acid, the dyestuff had the following formula:

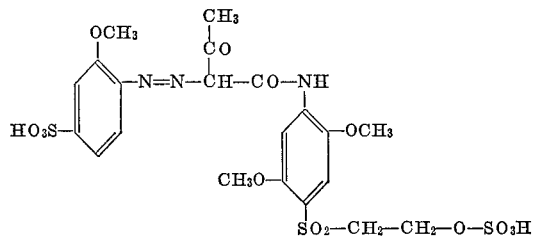

This dyestuff dyed fibers of natural and regenerated cellulose, in the presence of alkalies, clear greenish yellow shades. The dyeings had good fastness to wetting, to rubbing and to light.

When using, instead of 1-amino-2-methoxybenzene-4-sulfonic acid, 1-amino-2-methoxybenzene-5-sulfonic acid, 1-amino-2-methoxy-5-methylbenzene-4-sulfonic acid or 1-amino - 2,5 - dimethoxybenzene-4-sulfonic acid dyestuffs having similarly good properties were obtained.

EXAMPLE 6

100.5 parts by weight of 1-aminobenzene-4-β-hydroxyethylsulfone were stirred into 500 parts by weight of water, 25 parts by weight of glacial acetic acid were added, and then, 60 parts by weight of diketene were added dropwise within 1 hour at room temperature. Stirring was continued for one hour at 40° C. This solution was introduced into a diazo suspension, obtained in the usual manner by diazotization of 108.5 parts by weight of 1-amino-2-methoxy-5-methylbenzene-4-sulfonic acid. The further operation was carried out according to Example 2. Coupling was completed in the neutral to weakly acid range, adjusted by the addition of sodium carbonate. The dyestuff that had formed was precipitated by means of potassium chloride, filtered off and after drying at 70° to 80°, powdered finely and subsequently converted, according to Example 3, into the sulfuric acid ester. A yellow powder, which dissolved in water to give a yellow solution, was obtained. The dyestuff which, in form of the free acid, had the formula

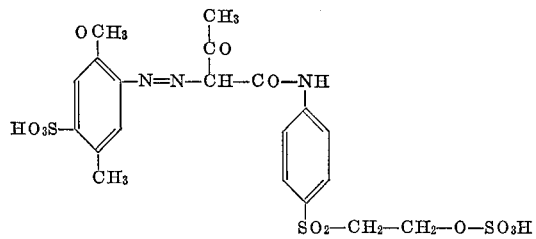

dyed fibers of natural and regenerated cellulose, in the presence of alkalies, brilliant greenish yellow shades having good fastness to wetting, to rubbing and a very good fastness to light.

When using, as starting compound for the coupling component, instead of 100.5 parts by weight of 1-aminobenzene-4-β-hydroxyethylsulfone, 100.5 parts by weight of 1-amino-benzene-3-β-hydroxyethylsulfone or 115.5 parts by weight of 1-amino-2-methoxybenzene-5-β-hydroxyethylsulfone, dyestuffs having similarly good qualities were obtained.

EXAMPLE 7

86.5 parts by weight of 1-aminobenzene-4-sulfonic acid were converted, according to Example 3, by means of diketene, into the corresponding acetoacetyl compound. This solution was introduced into a diazo solution obtained in the usual manner by diazotization of 122.5 parts by weight of 1-amino-2-methoxy-5-methylbenzene-4-β-hydroxyethylsulfone. The further operation was carried out according to Example 3 whereby a yellow powder was obtained, which dissolved in water to give a yellow solution.

In form of the free acid, the dyestuff had the following formula

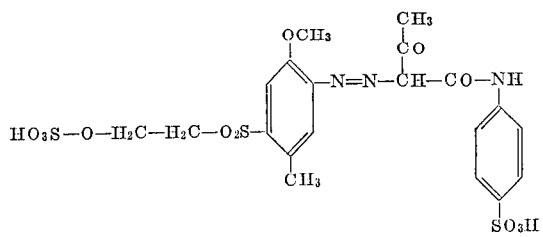

The dyestuff dyed fibers of natural and regenerated cellulose, in the presence of alkalies, brilliant greenish yellow shades having a good fastness to wetting and to light.

When using, instead of 86.5 parts by weight of 1-aminobenzene-4-sulfonic acid, 101.5 parts by weight of 2-naphthylamine-5,7- or -6,8-disulfonic acid, dyestuffs were obtained which gave similarly clear shades and had similarly good properties of fastness.

EXAMPLE 8

182 parts by weight of 1-(3'-aminobenzoyl)-amino-2-carboxy-benzene-5-β-hydroxyethylsulfone (obtained by the reaction of 1-amino-2-carboxy-benzene-5-β-hydroxyethylsulfone with m-nitrobenzoyl chloride and subsequent reduction of the nitro group) were introduced at room temperature into 900 parts by weight of sulfuric acid having a concentration of 95% by weight and the whole was stirred until solution was complete. Thereupon, the sulfuric acid solution was poured onto 1,800 parts by weight of ice powder and the sulfuric acid ester, which had precipitated quantitatively, was filtered off. It was then stirred with 1,000 parts by weight of water, neutralized with sodium bicarbonate, whereupon the sulfuric acid ester dissolved. 25 parts by weight of glacial acetic acid were then added, the whole was cooled to 0° to 5° C., 60 parts by weight of diketene were added dropwise within at least 2 hours, and stirring was continued for 6 hours while cooling with ice. The acetoacetyl compound that had formed, had partly precipitated. This suspension was introduced into a diazo suspension, obtained in the usual manner by diazotization of 108.5 parts by weght of 1-amino-2-methoxy-5-methylbenzene-4-sulfonic acid. The coupling mixture was neutralized by adding sodium carbonate and stirred until the formation of dyestuff was completed. The yellow monoazo dyestuff that had formed was precipitated by adding potassium chloride, filtered off and dried in the vacuum chamber at 50° to 60° C. A yellow powder, which dissolved in water to give a yellow solution, was obtained.

In the form of the free acid the dyestuff had the following formula

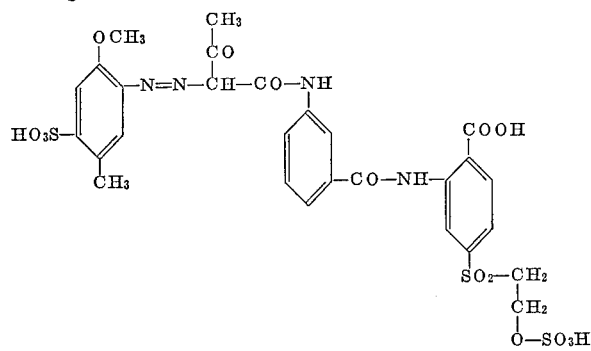

In the presence of alkalies, this dyestuff produced on fibers of natural and regenerated cellulose, brilliant, very greenish yellow dyeings and prints having a very good fastness to wetting and good fastness to light.

EXAMPLE 9

186 parts by weight of 1-(4'-aminobenzoyl)-aminobenzene-2,5-disulfonic acid (prepared by condensation of aniline-2,5-disulfonic acid with p-nitrobenzoyl chloride and subsequent reduction) were converted according to Example 8 by means of diketene into the acetoacetyl compound. This solution was introduced into a diazo solution, obtained in the usual manner by diazotization of 122.5 parts by weight of 1-amino-2-methoxy-5-methylbenzene-4-β-hydroxyethylsulfone. The further operation was carried out as described in Example 3, whereupon a yellow powder was obtained, which dissolved in water to give a yellow solution.

The dyestuff which, in form of the free acid, had the following formula

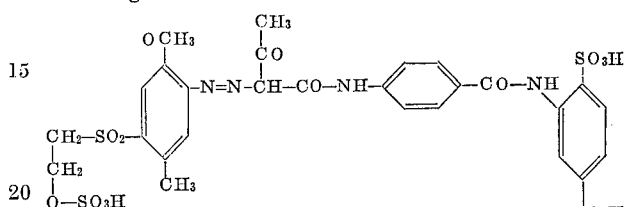

dyed fibers of natural and regenerated cellulose in the presence of alkalies, brilliant greenish yellow shades having a good fastness to wetting and to light.

EXAMPLE 10

122.5 parts by weight of 1-amino-2-methoxy-5-methylbenzene-4-β-hydroxyethylsulfone were converted, according to Example 1, into the sulfuric acid ester and subsequently, by means of diketene into the acetoacetyl compound. This solution was introduced into a diazo suspension, obtained in the usual manner by diazotization of 115 parts by weight of 1-amino-4-acetylaminobenzene-2-sulfonic acid.

By adding sodium carbonate, the coupling mixture was rendered weakly acid to neutral and coupling was completed in this pH-range. The dyestuff was isolated by salting out with potassium chloride, filtered off and dried in a vacuum chamber at 50° to 60° C. A yellow powder, which dissolved in water to give a yellow solution, was obtained. In form of the free acid the dyestuff had the following formula

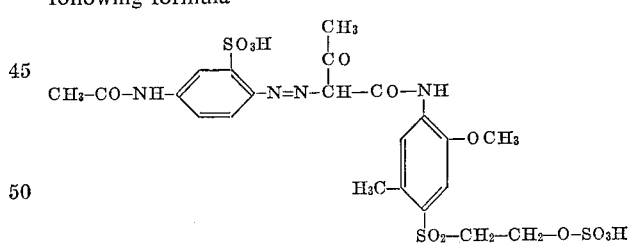

In the presence of alkalies, this dyestuff gave on fibers of natural and regenerated cellulose clear, greenish yellow dyeings and prints, which had a very good fastness to wetting and good fastness to light.

EXAMPLE 11

151.5 parts by weight of 1-naphthylamino-5,7-disulfonic acid were diazotized in the usual manner in 1,000 parts by weight of water and 125 parts by weight of concentrated hydrochloric acid. 182.5 parts by weight of 1-acetoacetylaminobenzene- 4 -β-hydroxyethylsulfone-sulfuric acid ester were then added, and the coupling mixture was rendered weakly acid to neutral by the addition of sodium carbonate and the mixture was stirred until coupling was complete. The dyestuff that had formed was precipitated by the addition of potassium chloride and then filtered off with suction.

The wet filter cake was dissolved in 1,800 parts by weight of water while heating gently. After cooling to 20° C., 625 parts by weight of a 16.5% sodium hydroxide solution were added rapidly and stirring was continued for some minutes. The mixture was then rendered weakly acidic by the addition of dilute hydrochloric acid and the separation of the dyestuff was completed by the addition of a small amount of sodium chloride. The dyestuff constituted, after separation and drying, a yellow brown powder, which dissolved in water to give a yellow solution.

The dyestuff had the following formula

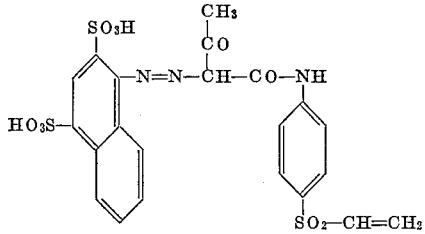

This dyestuff gave on polyamide and cellulose fibers, in the presence of alkalies, clear yellow dyeings having a good fastness to wetting.

EXAMPLE 12

83 parts by weight of the dyestuff having a strength of about 75% and obtained according to Example 11, were stirred for some time in 400 parts by weight of water. 12 parts by weight of diethylamine were then added dropwise within in a few minutes, at room temperature. Some time afterwards, the dyestuff that had formed began to separate. The whole was stirred for about 2 hours and the precipitation of the dyestuff was completed by the addition of a small amount of sodium chloride. The dyestuff was filtered off with suction and dried in vacuo at 50° to 60° C. The dyestuff obtained as a yellow powder dissolved in water to give a yellow solution and had the following formula

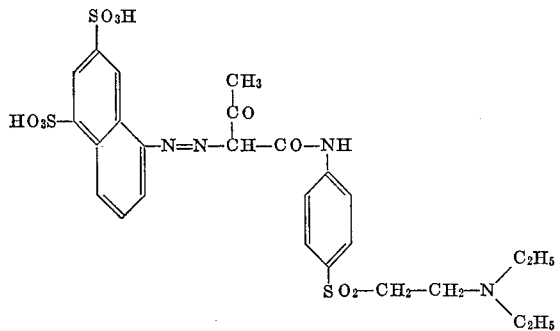

In the presence of alkalies, this dyestuff gave on cellulose fibers clear, greenish yellow prints or dyeings having the same properties of fastness as those of prints and dyeings produced with the starting dyestuff. Alkaline printing pastes made with this dyestuff had a greater stability than those made with the starting product.

EXAMPLE 13

80 parts by weight of the dyestuff having a strength of about 74% and obtained according to Example 6 were dissolved in 600 parts by weight of water, while heating gently. After cooling the mixture to room temperature, 125 parts by weight of a 16.5% sodium hydroxide solution were rapidly added dropwise and the whole was stirred for some minutes. The reaction mixture was rendered weakly acidic by the addition of dilute hydrochloric acid and the vinylsulfone dyestuff that had formed was filtered off with suction. The wet filter cake was stirred in 600 parts by weight of water having a temperature of 70° to 75° C. 100 parts by weight of sodium thiosulfate were added at the aforementioned temperature and the mixture was kept at this temperature for about 3 hours, while maintaining the pH-value of the mixture at 6.0 by slow and dropwise addition of a 50% acetic acid, in order to continuously neutralize the hydroxide ions which were forming during the reaction.

After cooling the thiosulfuric acid ester of the dyestuff was salted out by adding sodium chloride, filtered off with suction and dried in vacuo at 50° C. to 60° C.

The dyestuff obtained in form of a light yellow powder dissolved in water to give a yellow solution and corresponded to the following formula

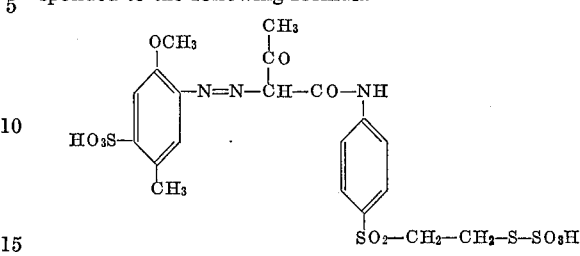

When used for the printing or dyeing of cellulose fibers, this dyestuff produced greenish yellow shades that had the same properties of fastness as the shades produced with the dyestuff described in Example 6. The new dyestuff had a better solubility than the starting dyestuff.

The dyestuffs listed in the following table can be prepared in a manner similar to that described in the foregoing examples. They give on cellulosic materials, wool, silk or polyamide fibers dyeings and prints that have similarly good properties of fastness.

| Diazo component | Coupling component | Shade |
|---|---|---|
| 1-amino-3-methoxy-4-acetyl-amino-benzene-6-sulfonic acid. | 1-acetoacetylamino-benzene-4-β-hydroxy-ethylsulfone-sulfuric acid ester. | Greenish yellow. |
| 1-amino-2-methoxy-4-nitro-benzene-6-sulfonic acid. | ___do___ | Do. |
| 4-amino-diphenyl-oxide-3-3-sufonic acid. | 1-acetoacetylamino-benzene-3-β-hydroxy-ethylsulfone-sulfuric acid ester. | Do. |
| 1-amino-2-benzyloxy-benzene-5-sulfonic acid. | 1-acetoacetylamino-2-methoxy 5-methyl-benzene-4-β-hydroxy-ethylsulfone-sulfuric acid ester. | Do. |
| 1-amino-2-ethoxy-naphthalene-6-sulfonic acid. | 1-acetoacetylamino-benzene-3-β-hydroxy-ethyl-sulfone-sulfuric acid ester. | Reddish yellow. |
| 2-amino-naphthalene-5-β-hydroxyethylsulfone-sulfuric acid ester. | 1-aceto-acetylamino-benzene-4-sulfonic acid. | Greenish yellow. |
| 1-amino-2-methoxy-5-methyl-benzene-4-sulfonic acid. | 1-acetoacetylamino-naphthalene-5-β-hydroxy-ethyl-sulfone-sulfuric acid ester. | Do. |
| 1-amino-2-methoxy-5-methyl-benzene-4-β-hydroxyethylsufone-sulfuric acid ester. | 1-acetoacetylamino-naphthalene-5-β-hydroxyethyl-sulfone-sulfuric acid ester-7-sulfonic acid. | Do. |
| 1-amino-2-methoxy-acid ester. | 3-acetoacetylamino-carbazole-x-sulfonic acid. | Do. |
|  | 2-acetoacetylamino-diphenylene oxide-6-sulfonic acid. | Do. |
| 1-amino-2-methoxy-5-methyl-benzene-4-β-chlorethyl-sulfone. | 2-acetoacetylamino-naphthalene-4,8-disulfonic acid. | Do. |
| 1-amino-2-methoxy-benzene-5-vinylsulfone. | ___do___ | Do. |

We claim:
1. A water-soluble monoazo dyestuff of the formula:

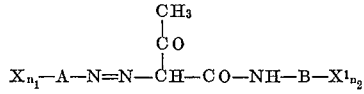

wherein A represents (a) phenyl substituted in ortho or para position to the azo group by lower alkoxy or benzyloxy or in para position to the azo group by acetylamino, and which may be further substituted by lower alkyl, lower alkoxy or nitro, or (b) unsubstituted naphthyl or naphthyl substituted by lower alkoxy; and B represents (a) phenyl, (b) phenyl substituted by lower alkyl, lower alkoxy or both, (c) naphthyl, or (d)

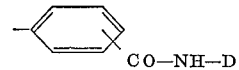

wherein D is phenyl or carboxyphenyl; X is $-SO_2CH_2CH_2OSO_3H$, $-SO_2CH_2CH_2Cl$ or $-SO_2CH=CH_2$; $X^1$ is $-SO_2CH_2CH_2OSO_3H$, $-SO_2CH_2CH_2SSO_3H$, $-SO_2CH=CH_2$ or —$SO_2CH_2CH_2N$(lower alkyl)$_2$; $n_1$ and $n_2$ are integers from 0 to 1, the sum of $n_1$ and $n_2$ being 1 or 2; and A and B additionally being substituted by a total of from one to two sulfonic acid groups.

2. The dyestuff of the formula

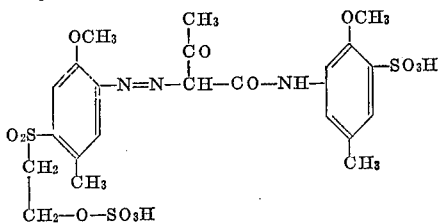

3. The dyestuff of the formula

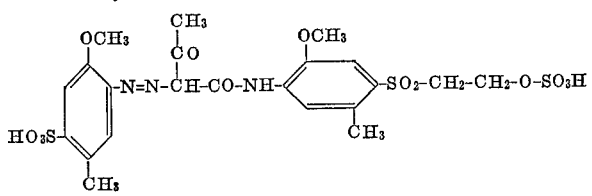

4. The dyestuff of the formula

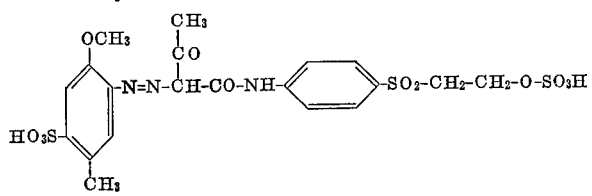

5. The dyestuff of the formula

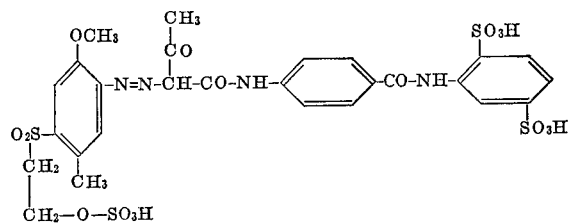

6. The dyestuff of the formula

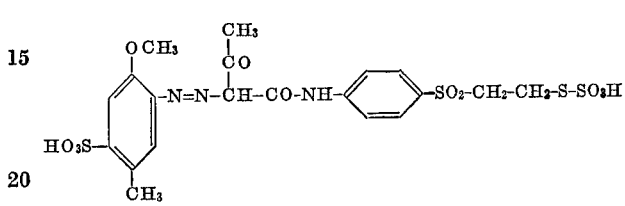

References Cited
UNITED STATES PATENTS
3,325,470  6/1967  Ribka et al. _____ 260—193

CHARLES B. PARKER, Primary Examiner

C. F. WARREN, Assistant Examiner

U.S. Cl. X.R.

8—41, 50